Nov. 5, 1946.  H. H. PLATT  2,410,459

ROTATIVE-WINGED AIRCRAFT

Filed Feb. 4, 1941

INVENTOR.
Haviland H. Platt
BY Leonard L. Kalish
ATTORNEY.

Patented Nov. 5, 1946

2,410,459

UNITED STATES PATENT OFFICE 2,410,459

ROTATIVE-WINGED AIRCRAFT

Haviland H. Platt, New York, N. Y., assignor to Rotary Research Corporation, Philadelphia, Pa., a corporation of Pennsylvania Application February 4, 1941, Serial No. 377,356

6 Claims. (Cl. 244—17)

My present invention relates to the heavier-than-air type of aircraft sometimes generically referred to as the "helicopter" and it relates more particularly to certain new and useful automatic regulation of the pitch of the supporting rotor or rotors of such aircraft.

It is well known that the various phases of flight of the helicopter require very different values of the pitch angle of the blades of its supporting rotor or rotors. Thus, for example, full power operation, whether climbing vertically or proceeding on a level path at full speed, or, indeed, any other full-power operation, requires a relatively large pitch in order to absorb the torque supplied by the engine without undue speeding up of the rotor. On the other hand, however, autorotation of the rotor in emergency descent, with power off, requires a relatively small pitch to prevent dangerous slowing down of the rotor.

In my United States Patent No. 2,074,805 I have described an automatic form of pitch regulator, applied to a rotor having an overrunning clutch and blades articulated for flapping, lagging and pitch change, characterized by operative correlation between lag and pitch, whereby an increase in torque, causing an increased lag of the blades with relation to the rotor hub, leads automatically to an increased pitch. Similarly, the removal of torque through engine failure, "or throttling down," causes the blade to return to its unlagged position, thus decreasing the pitch to a predetermined minimum value suitable for autorotation.

In the form of pitch regulator specifically described in my patent above referred to, the correlation between lag and pitch is generally one of direct proportionality in which the pitch angle varies by a constant fraction of the lag angle regardless of the amount of lag. Under these circumstances a graph on which pitch is plotted against lag is a straight line and the regulator may therefore be designated as having rectilinear response. It has now been found, through practice and research, that the regulator with rectilinear response, while representing a valuable advance in the art, still has certain disadvantages and deficiencies. Chief of these is a tendency to instability in operation. This is due to the fact that the lagged position of the blade is determined by the balance between three factors: torque, pitch and centrifugal force. Pitch and centrifugal force are interrelated in that a change in pitch causes a change in rotational speed and consequently a change in centrifugal force. Thus it is possible that, with a substantially fixed torque such as that of full engine throttle, a change in pitch may be offset by the corresponding change in centrifugal force, so that a balance may be struck in more than one lag position (for the same power-input and for the same torque). Under these conditions the equilibrium becomes unstable and there is no definitely established rotational speed. A pitch regulator with rectilinear response is found to be subject to this type of instability under certain operating conditions. A further disadvantage of the rectilinear type of regulator is that the pitch continues to increase when the blade lags beyond the normal operating range. When the rotor is running below normal speed, as in starting, this tends to prevent rapid acceleration by increasing the drag of the blades. The attainment of full rotational speed is thus undesirably delayed.

One object of my invention is to correct the unstable tendency described above and to provide a lag-responsive pitch regulator which shall under every circumstance establish a unique and stable rotational state.

Another object of my invention is to provide in a lag-responsive pitch regulator such operational characteristics that its response is reversed and the pitch is decreased with lag beyond the normal operating value, thus insuring reduced resistance when the rotor speed is low in flight or in starting.

I attain the above objects by certain novel mechanisms differing from the rectilinear-response regulator specifically described in Patent No. 2,074,805 above referred to, which novel mechanisms of the present invention give a response represented by a curved pitch-lag graph; the pitch increasing rapidly with lag when the lag is less than that required in the power-on operating range, but the change being relatively small throughout the normal power operating ranges, and with the pitch decreasing with lag when the lag is greater than that required in the normal power operating range. I find that the above sequence of responses may be attained with the use of a link type mechanism which yields a curved pitch-lag graph generally similar to a sine curve; variation in the proportions of its parts causing the response graph to approach a sine curve form more or less closely.

For the purpose of illustrating my invention, I have shown in the accompanying drawing a form thereof which is at present preferred by me, although it is understood that my invention is capable of embodiment in a wide variety of mechanical arrangements and that my invention is not limited to the precise type herein shown and described.

Referring to the drawing in which like reference characters indicate like parts:

Figure 1:
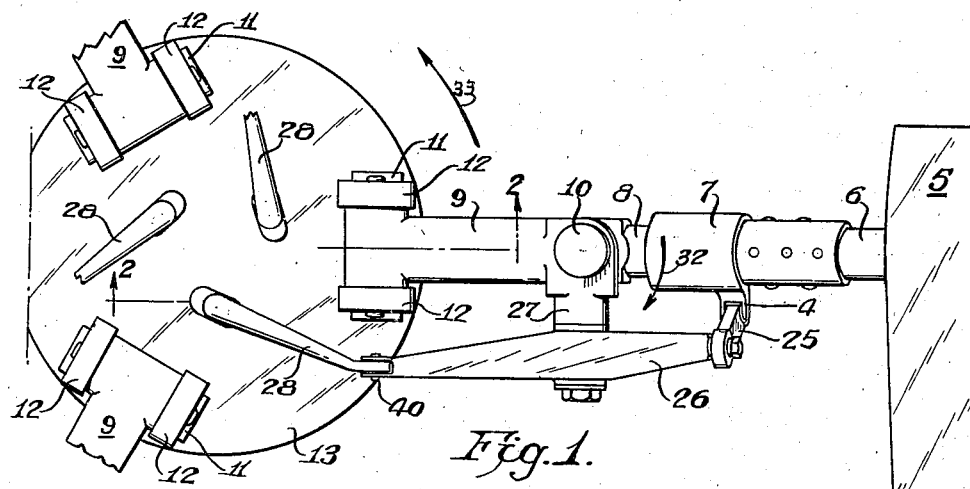
Figure 1 represents a plan view of a more or less schematic layout of a rotor hub and one rotor blade of a three-bladed rotor embodying my invention; the rotor blade being shown broken away.
Figure 5:
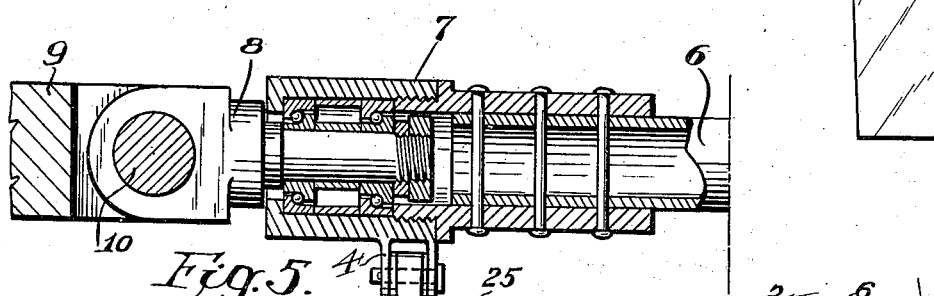
Figure 5 represents a cross-sectional view, on a somewhat enlarged scale, generally along the line 5—5 of Figure 2.

In the accompanying drawing, the rotor blade, which may be of any suitable airfoil form, is designated by the numeral 5, and is supported, through the spar 6, and the pitch-varying bearing housing 7 in the outer end of which the spar 6 is retained by pins, rivets or other suitable means, with freedom to rotate about its own axis, with relation to the spindle 8, by means of suitable thrust and radial ball or roller bearings operatively intervening the spindle 8 and the housing 7 (not shown).

The inner end of the spindle 8 is formed as an eye to fit in the forked end of the blade stub 9, in which it is retained by the lag pivot pin 10, about which the blade 5 is thus free to swing or lag in the surface of rotation. The inner end of the stub 9, is bored to receive the flapping pivot pin 11, by which it is retained in the lugs 12, formed integrally with the rotor hub 13. The rotor hub 13 is rotationally supported in any suitable radial and thrust bearings 14, mounted in the supporting housing 15, forming part of the rigid structure of the aircraft, and the housing cover 16 rigidly bolted to the housing 15. Mounted on the hub 13, is an overrunning clutch of any suitable type such as the cam or roller clutch shown, in which 17 is the inner member splined to hub 13, and 18 is one of a plurality of cams or rollers, and 19 is the outer cylindrical driving member. Bolted securely to the driving member 19, is the flange of the driving spindle 20, through which the torque of the power plant is applied; suitable gearing and shafting, or other transmission means (not shown) serving to transmit the power thereto from said power plant located conveniently in the body of the aircraft. Bearing 21 is interposed between the hub 13 and the driving member 19 to insure alignment when the hub 13 is rotating freely and the clutch overrunning. The ring nut 22 is screwed on to the hub 13 and serves to retain the clutch and bearings on the hub spindle. Surrounding the overrunning clutch and splined to the hub 13, is the rotor brake drum 23, cooperating with the brake band 24, which is supported by the housing 15 or cover 16 by any suitable means not shown, and is actuated by any suitable levers, links or the like (not shown) in order to arrest and prevent rotation of the rotor when the aircraft is at rest on the ground.

Formed integrally with or otherwise rigidly attached to the bearing housing 7 is the arm 4, pivotally connected through the link 25 to the outer end of the lever 26, which is mounted to rock freely about its pivotal support on the lug 27, formed as a rigid part of the blade stub 9. The inner end of the lever 26 is pivotally connected with the bent control rod 28, the point of connection 40 between lever 26 and rod 28 lying substantially in the extended axis of the flapping pivot pin 11. The shank of the control rod 28 passes through a slot or other clearances in the rotor hub 13 and attaches pivotally at its lower end to the flange 29 formed on the control lever 30. The control lever 30 is supported through the universal joint 31 (of the Cardan cross type or of any other suitable form) on the hub 13. Rotation is in the direction of the arrow 33. Suitable limit stops (not shown) are provided to prevent excessive displacement in flapping or lagging.

Figures 2, 3:
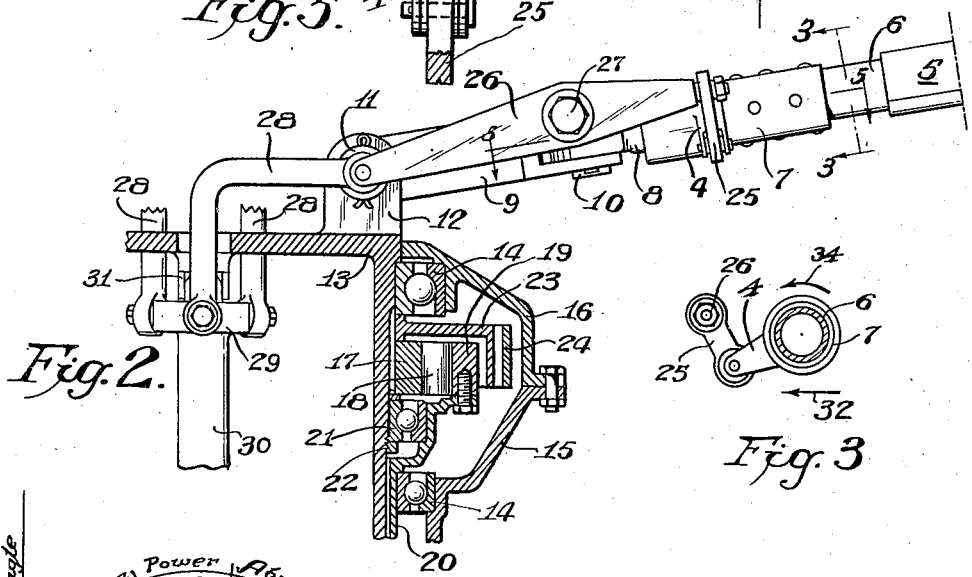
Figure 2 represents an elevational view of the same, illustrating also a schematic layout of the mounting of the rotor hub, the rotor brake, the control means and the overrunning clutch; partly sectioned generally on the line 2—2, Figure 1, and partly broken away.
Figure 3 represents a sectional view on line 3—3, Figure 2, illustrating the arrangement of my novel pitch regulating mechanism in the form at present preferred by me.

The operation of the automatic pitch regulator is completely independent of the control mechanism operated through the lever 30, and there would be no difference in its functioning if the outer end of the lever 26 were formed integrally with the blade stub 9. When the rotor is turning without any torque acting on the hub, as, for instance, in autorotative performance, the blade 5 assumes the position shown, with the axis of its supporting spar 6 generally passing through the rotation axis of the hub 13. When torque is applied tending to turn the hub 13 in the direction of the arrow 33, the resistance of the blade 5 causes it to lag with relation to the hub 13, swinging about the lag pivot 10 in the direction of the arrow 32, relative to the hub. The pitch arm 4 consequently moves to the left in Figure 3 (in the direction of the arrow 32) with relation to the outer end of the lever 26. The link 25 swings about its upper pivot so as to assume a more nearly vertical position, thus depressing its lower end and thereby causing rotation of the bearing housing 7 on its bearings in a direction of arrow 34, to increase the pitch angle of the blade 5. When a constant torque is applied to the rotor the blades will assume a definite angle of lag determined by the equilibrium between the blade resistance tending to increase the lag and the centrifugal force tending to bring the blade back into line. The pitch angle, being dependent on the lag angle in predetermined relation, is thus fixed also.

Figure 4:
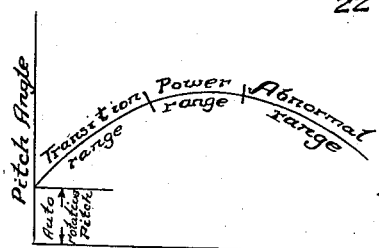
Figure 4 represents a graph illustrating in general the nature of the lag-pitch response afforded by my novel pitch-regulator.

When the blade lags so far, under the influence of a strong torque or low centrifugal force, that the link 25 is vertical, there will be no further increase of pitch with lag, and in case the lag should proceed beyond that point, then the action of the link 25 will be to raise arm 4, thus reducing pitch. This sequence of responses is graphically illustrated in Figure 4, which shows the response graph computed for a typical practical rotor. The curve approximates a sine curve and shows a comparatively large pitch change in the transition from autorotative operation to power flight, a comparatively small change in pitch over the complete range of normal flight power and a diminishing pitch when the lag increases beyond the normal range. This form of response graph leads to rotor stability under all operating conditions and provides for more rapid acceleration after a sudden application of power.

The operation of the control mechanism illustrated is as follows: the inclination of the control lever 30 causes the rods 28 on one side of the hub to rise and those on the other side to descend, thus actuating levers 26 and links 25 to increase the pitch of blades 5 on one side and decrease it on the other. If the inclination of lever 30 is maintained in a fixed direction relative to the aircraft structure, either by direct manual control or by means of any suitable mechanism, not shown, the pitch of each blade is caused to undergo a cyclic fluctuation as it passes around the revolution, with a maximum at one fixed azimuth and a minimum at the point opposite. Thus the blades are caused to flap upwardly in passing one side of the revolution and downwardly in passing the other side. The thrust of the rotor is thus directed at will in any desired direction by a corresponding motion of the control lever 30.

In case of power failure in flight, the blades 5 move into the position shown (that is, their "no-torque" position or "in line" position), their pitch being decreased automatically by the regulator action to the low value suitable for autorotation. The rotor thereupon takes up free rotation under the influence of the airflow over it; the overrunning clutch enabling it to continue in rotation independent of the transmission and power plant.

While for purposes of illustration I have shown my invention applied to a rotor having control by cyclic pitch variation, it is understood that it may be applied with equal effect to rotors having control by tilting the hub, to rotors fixed in relation to the aircraft which are equipped with means for control by tilt of the entire craft, or to any other applicable type of control. I therefore desire the present embodiment to be considered in all respects as illustrative and not restrictive, reference being had to the appended claims rather than to the foregoing description, to indicate the scope of the invention.

Having thus described the invention, what is hereby claimed as new and desired to be secured by Letters Patent is:

1. An airscrew including a hub, a plurality of airfoil blades pivotally secured to said hub by pivoting mechanism permitting pitch-varying and lagging displacements of said blades in relation to said hub and pitch-varying mechanism including means correlating the lagging and pitch-varying displacements of said blades so that with the lagging movement of the blade its pitch increases to a maximum and then decreases approximately in a sine curve relationship.

2. An airscrew including a hub, a plurality of airfoil blades pivotally secured to said hub by pivoting mechanism permitting pitch-varying and lagging displacements of said blades in relation to said hub and pitch-varying mechanism including means correlating the lagging and pitch-varying displacements of said blades in such a manner that pitch increases with lag for relatively small displacements of said blades and decreases with lag for relatively large displacements.

3. An airscrew including a hub, a source of power for driving said hub, a plurality of airfoil blades pivotally secured to said hub by pivoting mechanism permitting pitch-varying and lagging displacements of said blades in relation to said hub, and pitch-varying mechanism including means correlating the lagging and pitch-varying displacements of said blades in such a manner that at any given rotational speed pitch increases with lag for relatively small torque values at the hub and that pitch decreases with further increased torque values.

4. An airscrew including a hub, a source of power for driving said hub, a plurality of airfoil blades pivotally secured to said hub by pivoting mechanism permitting pitch-varying and lagging displacements of said blades in relation to said hub and in response to variations in torque applied to said hub, and pitch-varying mechanism including means correlating the lagging and pitch-varying displacements of said blades in such a manner that pitch increases rapidly with lag for relatively small torque values at the hub, changes slowly for normal flight torque values and decreases for large applications of torque.

5. An aircraft lift rotor including a revolubly supported hub, a source of power for revolving said hub, a plurality of blade-articulating stubs pivotally secured to said hub for up-and-down displacement, an airfoil blade pivotally secured to each of said stubs by pivoting mechanism permitting lagging displacements of the blade to-and-fro generally in the surface swept by the blade and rotational pitch-varying displacements, a pitch-control arm carried by and extending laterally from the root-zone of the blade, a pivot carried by said stub in operative juxtaposition to said pitch-control arm, and a link operatively interconnecting said pitch-control arm and said pivotal support.

6. An aircraft lift rotor including a revolubly supported hub, a source of power for revolving said hub, a plurality of blade-articulating stubs pivotally secured to said hub for up-and-down displacement, an airfoil blade pivotally secured to each of said stubs by a pivoting mechanism permitting lagging displacements of the blade to-and-fro generally in the surface swept by the blade and rotational pitch-varying displacements, a pitch-control arm carried by and extending laterally from the root-zone of the blade, a pivotal support carried by said stub, a manually-operable pitch-control arm pivotally carried upon said pivotal support, and having at its outer end a pivot in operative juxtaposition to said pitch-control arm extending from the root-zone of the blade, and a link operatively interconnecting said pitch-control arm extending from the root-zone of the blade with said last-mentioned pivot.

HAVILAND H. PLATT.